Dec. 17, 1935.  R. McCRAITH  2,024,379
METHOD OF MAKING RADIATORS
Filed Oct. 24, 1932
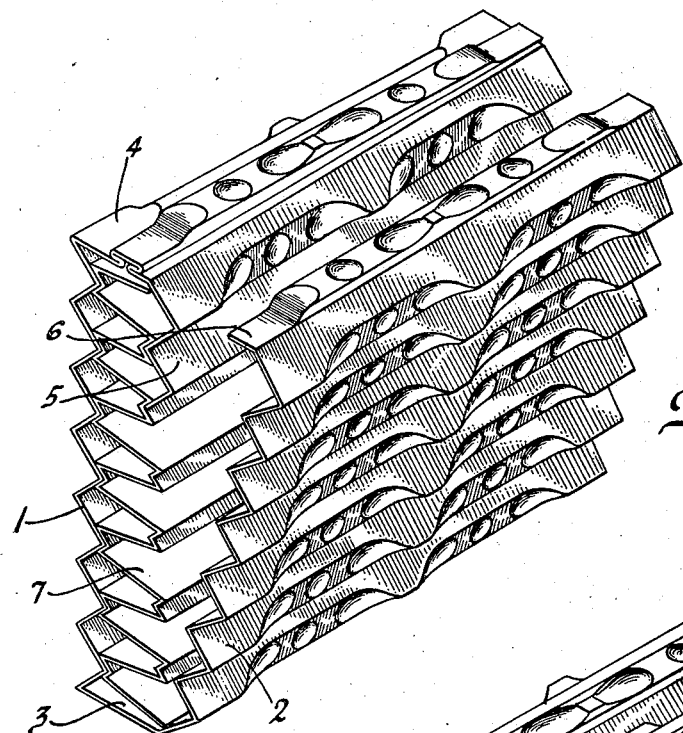
Fig. 1
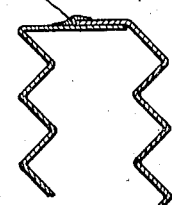
Fig. 3
Fig. 4
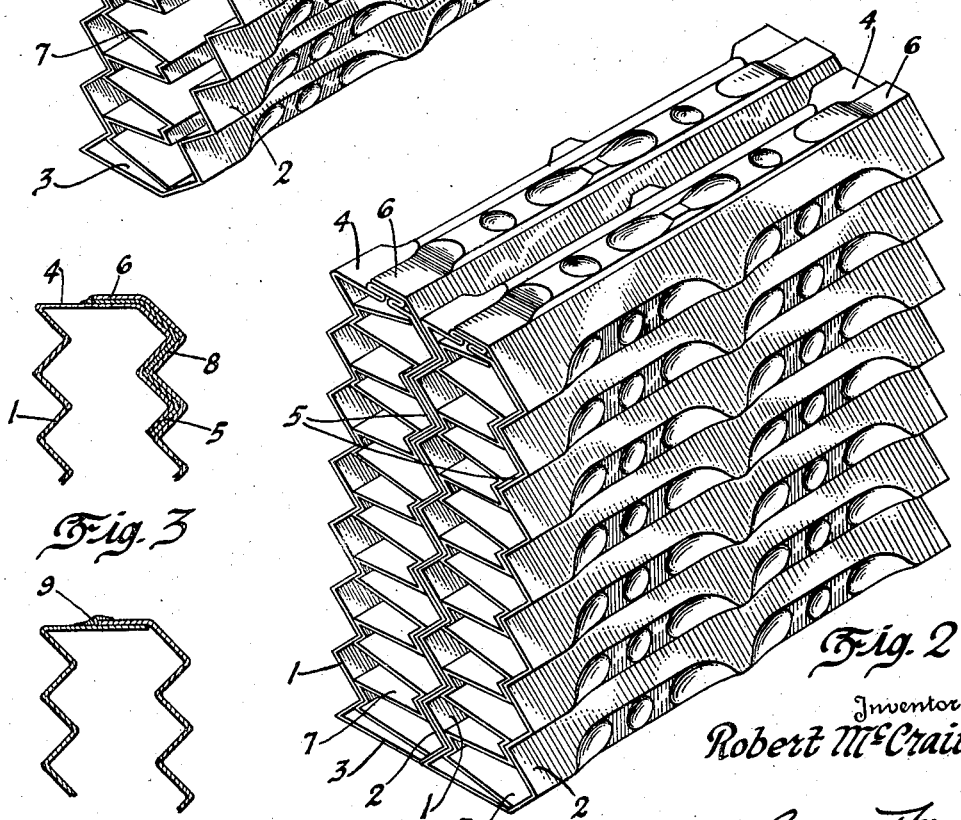
Fig. 2
Inventor
Robert McCraith
By Blackmore, Spencer & Flink
Attorneys Patented Dec. 17, 1935

2,024,379

UNITED STATES PATENT OFFICE 2,024,379

METHOD OF MAKING RADIATORS

Robert McCraith, Lockport, N. Y., assignor, by mesne assignments, to General Motors Corporation, Detroit, Mich., a corporation of Delaware Application October 24, 1932, Serial No. 639,212

4 Claims. (Cl. 113—118)

This invention relates to heat exchange devices and more particularly to improved methods of manufacturing cores of the type most commonly used in the radiator of an engine cooling system.

The conventional automobile radiator involves a heat dissipating unit or core interposed between inlet and outlet tanks and made up of a number of spaced passages for the flow in thin streams of water or other cooling medium from which heat is transferred through the walls of the passages to air passing through open spaces in the core. The present invention has to do especially with the so-called cellular type of radiator core, which is made up by passing a narrow strip of metal, such as copper or brass, having good heat conducting properties, through a forming machine to give the desired shape and shear to given length a number of strips, each of which is then bent upon itself in elongated loop fashion about a preformed separator or fin strip, and the opposite ends joined together by a hand soldering operation. The sub-assembly unit thus formed is placed side by side with a number of similar units, the adjacent walls of adjoining units being nested together in proper spaced relation to constitute water passageways and the whole assembly clamped in a suitable fixture and while so clamped the front and rear faces successively are dipped first in an acid solution and then in molten solder, the solder sealing the mating edges of the walls of each passageway and joining the several strips into a unitary assembly.

I have found that when portions of the metal walls are in continuous and firm contact transversely of the core, the acid and the solder will flow upwardly for some distance by capillary attraction between such contacting surfaces at the time the edges are dipped into the acid and solder baths. This flow by capillary attraction is sufficient to give a bond and seal entirely across the core, even in the case of a relatively deep core, since the flow between such surfaces in any case is inward from both sides, first when one face is dipped and then when the other face is dipped. With this in mind I propose to eliminate the hand soldering operation heretofore mentioned as necessary to join the adjacent ends of the looped wall strip in the sub-assembly unit and simply overlap and interfit these end portions in good surface contact with each other so that they will be joined and sealed by capillary flow at the time the whole assembly is united by the solder dip.

For a better understanding of the nature of the invention, reference is made to the accompanying drawing illustrating a preferred embodiment and wherein Figure 1 is a detail perspective view of a sub-assembly unit with one of the walls bent outwardly so as to illustrate to better advantage the relation of the parts; Figure 2 is a perspective view of two sub-assembly units nested together; Figure 3 is a sectional view of the soldered ends of a wall strip, the fin strip being omitted for the purpose of clarity, and Figure 4 is a view similar to Figure 3, but illustrating the type of joint produced by the hand soldering practice followed heretofore.

Referring to the drawing, the reference characters 1 and 2 indicate a pair of walls or partitions, each of which is intended for cooperation with a corresponding or complemental wall on a mating sub-assembly unit when placed in side to side relation to afford a water passageway. These two walls 1 and 2 are a part of a single preformed strip bent upon itself in looped formation with an intermediate portion extending laterally between the walls as at 3 at one end of the loop. The free end of the wall 1 is bent or turned laterally to form the end portion 4 and then bent back in parallelism with the wall 1 as at 5. The end of the wall 2 has a part turned laterally as at 6 and is intended to overlap the end 5 and a part of the end section 4. It will thus be seen that the end portions of the two walls overlap for a considerable extent, and since the irregular surface in one wall mates or corresponds to the contour to the other wall, the overlapping parts will be snugly internested and present adjacent surfaces in continuous contact across the walls and of considerable width. Within the loop formed by the wall strip may be located a separator or fin strip 7 of any suitable configuration, to divide the intervening air space into a number of small cells and provide heat radiating fins on the walls of adjacent water tubes.

When several of such sub-assembly units are brought together and nested, as are the two units illustrated in Figure 2, the dipping of first one face and then the other face of the assembly in a solder bath will not only seal the front and rear edges of abutting walls, but will result in an inward flow of solder between the contacting surfaces of the overlapped end portions to securely bond these parts together and prevent any leakage therebetween.

In the exaggerated view, Figure 3, there is illustrated the thin layer 8 of solder between the overlapping end portions and for the purpose of comparison there is illustrated in Figure 4 the type of seal produced by the customary hand soldering operation. The seal in Figure 4 involves a thin bead 9 of solder deposited on the exterior surfaces of the adjoining ends of the outer wall prior to the time the sub-assembly units are placed side by side. This hand soldering operation can be entirely eliminated, thereby reducing manufacturing costs and saving both time and labor and a better and more satisfactory seal effected, if the ends are overlapped a proper amount with their adjacent surfaces in continuous contact to promote the capillary flow of solder at the time of the usual solder dip, as hereinbefore described.

I claim:

1. The method of forming a radiator, including bending a number of wall strips each into an elongated loop having corrugated sides with the opposite terminal portions extending toward each other in one of said sides and overlapping in nested relation throughout the transverse extent of the strip, assembling side by side the looped strips with their corrugated portions interfitting, and then soldering the overlapping faces by capillary flow.

2. The method of making a heat exchanger including forming a number of sub-assembly units each by bending a strip of metal into an elongated loop having corrugated sides, with the end portions of the strip in overlapping nested relation, placing a number of such units side by side with their corrugations interfitting and soldering the interfitting faces by capillary flow.

3. The method of making a radiator core, including working a flat strip to provide therein a succession of like formations, bending a given length of the strip into an elongated loop having corrugated side walls adapted to receive therein a fin strip, with the opposite ends of the strip in overlapping nested relation in one of the side walls of the loop throughout a length containing several of said like formations, assembling several of such units side by side with the corrugations thereon in interfitting relation and finally dipping opposite faces of the group of units in solder to join the units and at the same time seal the overlapped ends of each strip.

4. The method of joining the units of a radiator core having corrugated walls, which consists in folding a corrugated strip so that the ends overlap to form a unit, assembling a number of such units side by side with their corrugations in nested relation, and then joining the units and sealing the joints by capillary flow from molten solder applied to the edges of said walls.

ROBERT McCRAITH.